No. 666,494. Patented Jan. 22, 1901.
J. C. CARPENTER & J. McILVAIN.
CULTIVATOR FOR LISTED CORN.
(Application filed Nov. 8, 1900.)
(No Model.)
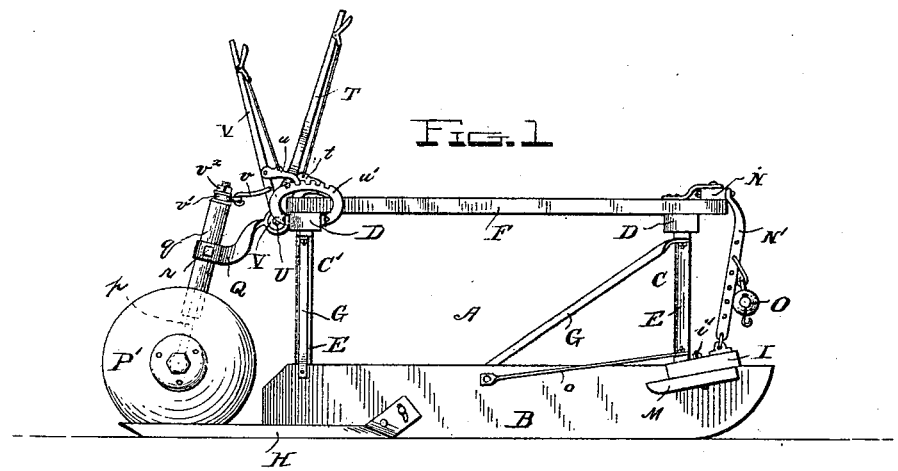
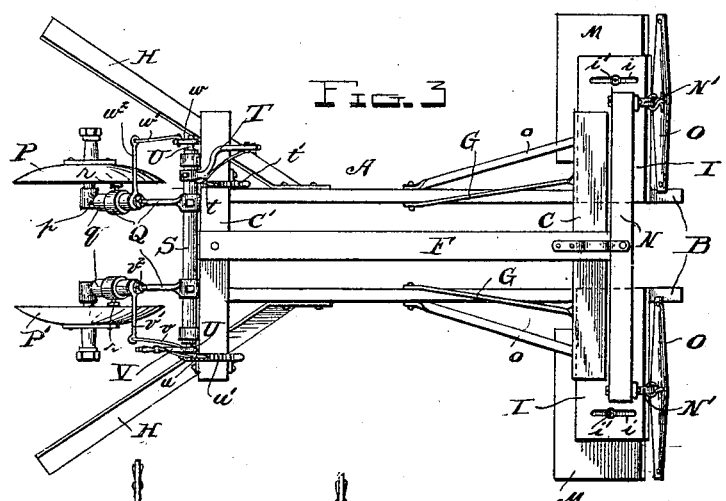
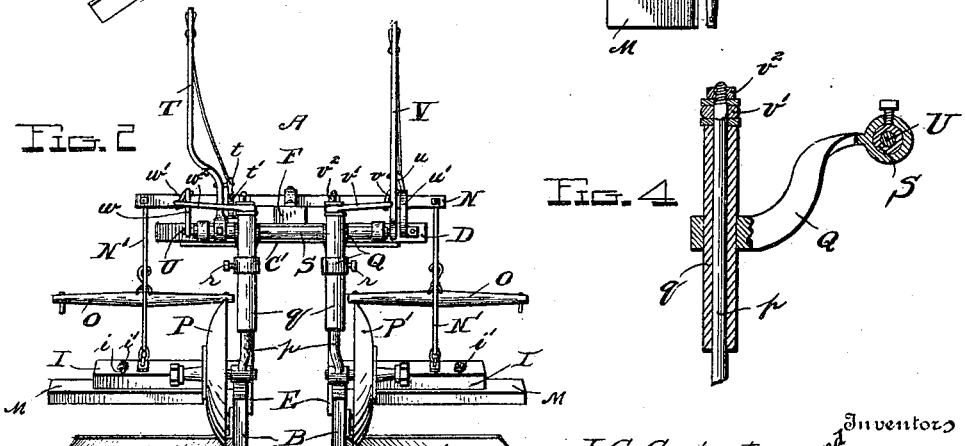
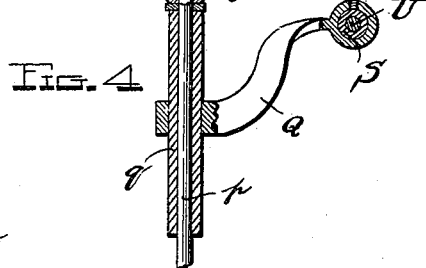
Inventors
J. C. Carpenter and
J. McIlvain
Witnesses
Attorneys
THE NORRIS PETERS CO., PHOTO-LITHO., WASHINGTON, D. C.

UNITED STATES PATENT OFFICE.

JAMES C. CARPENTER AND JOHN McILVAIN, OF COUNCIL GROVE, KANSAS.

CULTIVATOR FOR LISTED CORN.

SPECIFICATION forming part of Letters Patent No. 666,494, dated January 22, 1901.

Application filed November 8, 1900. Serial No. 35,848. (No model.)

*To all whom it may concern:*

Be it known that we, JAMES C. CARPENTER and JOHN McILVAIN, citizens of the United States, residing at Council Grove, in the county of Morris and State of Kansas, have invented certain new and useful Improvements in Cultivators for Listed Corn; and we do declare the following to be a full, clear, and exact description of the invention, such as will enable others skilled in the art to which it appertains to make and use the same.

Our invention relates to an improved cultivator for listed corn, and has for its object to provide a simple, convenient, and efficient construction of device of this character whereby the cultivating operation may be easily and expeditiously performed.

To this end the invention consists of certain novel features of construction, combination, and arrangement of parts, as will be hereinafter more fully described, and particularly pointed out in the appended claims.

In the accompanying drawings, Figure 1 is a side elevational view of our improved cultivator. Fig. 2 is an end elevation of the same. Fig. 3 is a top plan view. Fig. 4 is a detail sectional view through the tubular shaft and sleeve of one of the disk-stems.

Like reference characters designate corresponding parts throughout the several views.

A in the drawings designates the frame of the cultivator, comprising the spaced runners B B and front and rear arches C C', the latter consisting each of an upper cross-bar D, supported by vertical standards E. A bar F, extending longitudinally of the frame, centrally connects the cross-bars D and, in conjunction with braces G, rigidly unites the parts of the frame.

H H are divergent knives projecting rearwardly and outwardly from the runners at a diagonal angle and set at a forward and downward inclination. The sled or runners of the frame run, as usual, in the lister-furrow, and the knives operate to cut off the ridge on opposite sides of the corn.

From the forward ends of the runners inclined wings or brackets I I extend outwardly and laterally and are set at an angle, with their front edges elevated, and these wings are provided with transverse slots $i$ $i$ for the passage of bolts or like fastening devices $i'$ $i'$, which secure the scrapers, drags, or smoothing-boards M M thereto, so that the latter may be adjusted to float the ground heavier or lighter, as desired. The drags or scrapers correspond in arrangement to the wings, so that by simply moving the drags forwardly they will be raised and by moving them rearwardly they will be lowered in an obvious manner.

N is a doubletree pivoted to the forward end of the bar F and from the opposite ends of which depend links or draft-irons N'. These draft-irons are secured at their lower ends to the wings I and are each provided with a plurality of openings to receive hooks or analogous connections on singletrees O, whereby the height of the draft may be varied. Braces $o$ supplement the action of the draft-irons in bracing the wings and drags against rearward movement.

Arranged in rear of the runners are a pair of covering-disks P and P', to the axles of which are connected vertical stems or standards $p$, journaled in bearing-sleeves $q$, mounted in sockets upon the outer ends of bearing-brackets Q. The sleeves are adjustable in the sockets and are adapted to be held fixed in adjusted position by set-screws $r$. The bearing-brackets are clamped or otherwise suitably secured to a tubular shaft S, mounted to oscillate in bearings upon the rear portion of the cross-bar of the rear arch C', and to said shaft is connected a lever T, by means of which the shaft may be turned to raise or lower the brackets Q, and consequently elevate or depress the disks. This lever is provided with a pawl $t$ to engage a rack $t'$ on the frame, whereby the lever may be locked in position to hold the disks elevated whenever it is desired to throw the same out of operation, as in making turns and traveling to and from the ground to be cultivated. Through the shaft S extends a rod U, to one end of which is connected an adjusting-lever V, provided with a pawl $u$ to engage a rack $u'$ on the frame. This lever carries a link $v$, which is connected to a crank-arm $v'$, having a socket engaging a squared portion upon the upper end of the stem or standard of the disk P' and retained in place by a nut $v^2$. Upon the opposite end of the rod U is a crank-arm $w$, connected by a link $w'$ with a crank-arm $w^2$, having a socket engaging a squared portion on the upper end of the stem or standard of the disk P. By this construction it will be seen that by moving the lever V in one direction or the other the stems or standards $p$ will be turned to simultaneously adjust both disks at any desired angle to the frame and in the same relation to regulate the throwing of the earth as occasion requires. By means of the set-screws $r$ the disks may be set so as to secure a nicety of adjustment in a vertical direction and to regulate the degree of adjustment effected by the lever V and connections, as will be readily understood.

By substituting a tongue for the doubletree the device may be used also for cultivating check-rowed corn.

Having thus described our invention, what we claim, and desire to secure by Letters Patent, is—

1. In a cultivator of the character described, the combination of runners, wings extending laterally from the runners and set at an angle thereto with their front edges elevated, and drags or smoothing-boards adjustably connected to said wings whereby said boards may be raised and lowered by adjusting the same forwardly or rearwardly, substantially as set forth.

2. In a cultivator of the character described, the combination of runners, arches connecting the runners, wings extending laterally from the runners and set at an angle thereto, drags or smoothing-boards adjustably connected to said wings, a doubletree pivoted to the front arch, draft-irons depending from the doubletree and connected to said wings, and singletrees connected to said draft-irons, substantially as set forth.

3. In a cultivator of the character described, the combination of a frame, a pair of disks, means for raising and lowering the disks, a tubular rock-shaft, a rod extending through the shaft, an operating-lever, and connections between the rod, lever and standards of the disks for simultaneously moving the disks to set them at different angles relative to the line of draft substantially as set forth.

In testimony whereof we have hereunto set our hands in presence of two subscribing witnesses.

JAMES C. CARPENTER.
JOHN McILVAIN.

Witnesses:
  H. E. HEEGAR,
  M. METZGOR.